US008428397B1

(12) United States Patent
Brandt

(10) Patent No.: US 8,428,397 B1
(45) Date of Patent: Apr. 23, 2013

(54) SYSTEMS AND METHODS FOR LARGE SCALE, HIGH-DIMENSIONAL SEARCHES

(75) Inventor: Jonathan W. Brandt, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 326 days.

(21) Appl. No.: 12/869,133

(22) Filed: Aug. 26, 2010

(51) Int. Cl.
*G06K 9/46* (2006.01)
*G06K 9/00* (2006.01)
*G06K 9/60* (2006.01)

(52) U.S. Cl.
USPC ............ 382/305; 382/195; 382/251; 382/306

(58) Field of Classification Search .................... 382/305, 382/306, 195, 251
See application file for complete search history.

(56) References Cited

U.S. PATENT DOCUMENTS

| | | | |
|---|---|---|---|
| 6,389,424 B1 | 5/2002 | Kim et al. | |
| 6,484,172 B1 | 11/2002 | Lee et al. | |
| 6,834,278 B2 | 12/2004 | Yu et al. | |
| 7,117,217 B2 | 10/2006 | Ooi et al. | |
| 7,664,333 B2 * | 2/2010 | Kasutani | 382/251 |
| 8,027,380 B2 * | 9/2011 | Vasilache et al. | 375/240 |
| 8,254,697 B2 * | 8/2012 | Isard et al. | 382/209 |
| 8,370,338 B2 * | 2/2013 | Gordo et al. | 707/723 |

OTHER PUBLICATIONS

Jégou, H.; Douze, M.; Schmid, C.; Pérez, P.; , "Aggregating local descriptors into a compact image representation," Computer Vision and Pattern Recognition (CVPR), 2010 IEEE Conference on , vol., no., pp. 3304-3311, Jun. 13-18, 2010.*
Herve Jegou, Matthijs Douze, Cordelia Schmid, "Searching with quantization: approximate nearest neighbor search using short codes and distance estimators," INRIA, inria-000410767, version 1, Aug. 24, 2009, 28 pages.
Yair Weiss, Antonio Torralba, Rob Fergus, "Spectral Hashing," 2008, 8 pages.

* cited by examiner

*Primary Examiner* — Bhavesh Mehta
*Assistant Examiner* — Utpal Shah
(74) *Attorney, Agent, or Firm* — Wolfe-SBMC

(57) ABSTRACT

Methods and systems for fast, large scale, high-dimensional searches are described. In some embodiments, a method comprises transforming components of a high-dimensional image descriptor into transformed components in a transform domain, allocating one or more bits available within a bit budget to a given transformed component within a first subset of transformed components as a function of a variance of the given transformed component, independently quantizing each transformed component within the first subset of transformed components, generating a compact representation of the high-dimensional image descriptor based, at least in part, on the independently quantized components, and evaluating a nearest neighbor search operation based, at least in part, on the compact representation of the high-dimensional image descriptor.

20 Claims, 7 Drawing Sheets

SYSTEMS AND METHODS FOR LARGE SCALE, HIGH-DIMENSIONAL SEARCHES

BACKGROUND

1. Field of the Invention

This specification relates to computer technologies, and, more particularly, to systems and methods for performing fast, large scale, high-dimensional searches.

2. Description of the Related Art

Finding nearby points among a large set in high dimensions is at the heart of many important applications. These applications include, for example, nearest neighbor classification, similarity search, and feature matching, to name a few.

For instance, consider an image matching application where an input image is compared against a large database of stored images in order to find a match. Each image may be represented by "descriptors," such as scale-invariant feature transform ("SIFT") descriptors, Speeded Up Robust Features ("SURF") descriptors, global image feature ("GIST") descriptors, or the like. In a typical case, each image may have tens or hundreds of descriptors, and each descriptor may in turn contain hundreds or thousands of dimensions or features. In this type of environment, finding a match invariably involves performing one or more large scale, high-dimensional searches.

Despite prolonged study, the problem of efficiently finding nearby points in high dimensions remains open. This long-standing difficulty in finding an exact nearest neighbor in high dimensions has led to the use of approximate algorithms, as well as domain-specific approaches. Recently, image and video retrieval have been the subject of numerous practical applications. For video retrieval tasks, for example, the number of points to search is usually much larger than can be held in a computer system's memory. This has led to the development of certain compressed representations, each being typically custom-designed for a specific application.

Mathematically, search problems may be generically posed as follows. First, consider a finite set of points $X \subset \mathbb{R}^n$, $|X|=N|$, drawn from the probability distribution $p(x)$ defined over $\mathbb{R}^n$, where $\mathbb{R}^n|$ refers to an n-dimensional space with real coordinates. Point proximity may then be determined by a metric $d(x, x')$, where x is a query point and x' is a point in a database. In this context, two fundamental proximity queries are known as Radial and Nearest-k. A Radial search returns a set of points within a given radius of a query, whereas a Nearest-k search classifies an object based on closest training examples within $\mathbb{R}^n|$.

One approach to the search problem involves hash-based retrieval. Hash-based retrieval may include performing a quantization operation followed by a look-up operation based on the quantized representation. Quantization aims to identify a unique partition containing x within a finite partitioning of $\mathbb{R}^n|$, whereas an index look-up attempts to return all x'∈X contained within the given partition. This technique may be used for near-duplicate search, where one can rely on a hash collision even when the representation includes of a large number of bits. However, for proximity searches, such as Radial and Nearest-k, hash-based retrieval becomes ineffective as the sparseness of the code space increases.

SUMMARY

The present specification is related to computer technologies. Certain embodiments of methods and systems disclosed herein may explore the relationship between nearest neighbor techniques and that of signal representation and quantization to enable fast, large scale, high-dimensional searches. These types of searches are often the fundamental components of various applications including, for example, object recognition, 3D modeling, mapping, navigation, gesture recognition, etc.

An illustrative, non-limiting method may provide efficient techniques that employ transform coding, non-uniform data-driven bit allocation, and distortion-reducing or minimizing non-uniform product quantization to create a compact representation for a high-dimensional image descriptor. This compact representation may then be used in a nearest neighbor search operation as part of, for example, a k-nearest neighbor image classification process, an image retrieval process, and/or a local image feature matching process.

In some embodiments, one or more look-up tables may be constructed to speed up a nearest neighbor search operation. These look-up tables may be, for example, one-dimensional look-up tables created a query time. Additionally or alternatively, the look-up tables may be two-dimensional look-up tables created prior to a query. The former may be particularly useful in the context of k-nearest neighbor image classification and retrieval operations, whereas the latter may find applicability in a local image feature matching process or the like.

The effectiveness of the systems and methods disclosed herein is demonstrated in a range of applications, including large scale retrieval, scene classification, feature matching, and image similarity using a non-Euclidean metric. Through experiments on standard data sets, it is shown that these systems and methods are competitive with current state-of-the-art methods, and in fact provide greater speed and effectiveness.

Figure 1:
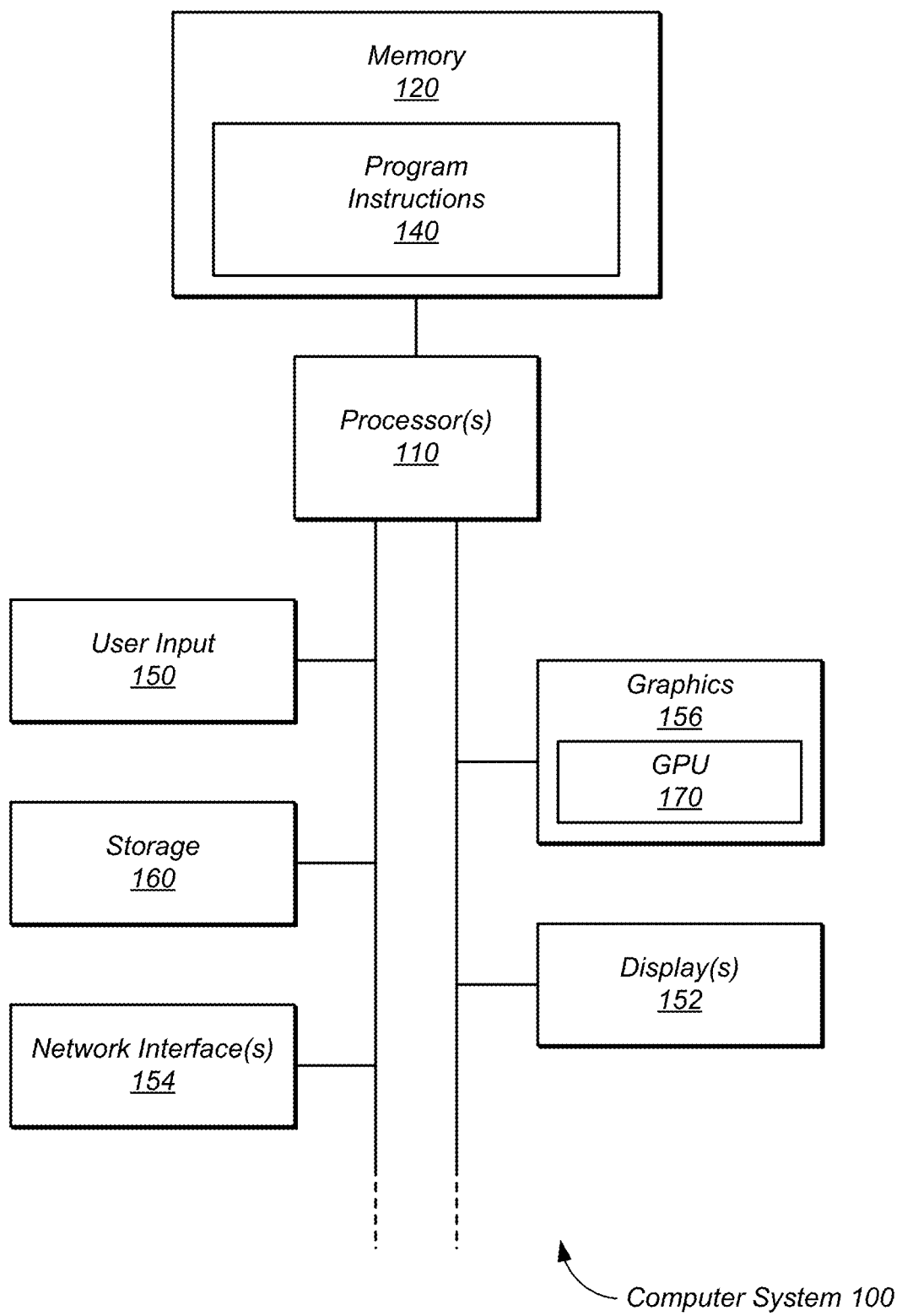
FIG. 1 is a block diagram of an illustrative computer system or device configured to implement some embodiments of the techniques described herein.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. The headings used herein are for organizational purposes only and are not meant to be used to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION OF EMBODIMENTS

Introduction

This specification first presents an illustrative computer system or device, as well as an illustrative image analysis module that may implement certain embodiments of methods disclosed herein. The specification then provides several techniques for: (1) generating a compact representation of a high-dimensional descriptor; (2) estimating distances among components of the high-dimensional descriptor; and (3) performing fast, high-dimensional searches based at least in part on those estimated distances. The final portion of the specification discusses various applications and experiments where the systems and methods described herein have been employed.

Some of the embodiments disclosed herein are in the field of digital, image processing and computer vision, and therefore are suitable for use in image searches. It should be understood, however, that the techniques described herein are not limited to use with digital image data. Where suitable, these techniques may be employed in any application where other types of high-dimensional searches may be performed, such as, for example and without limitation, medicine (e.g., microarray DNA analysis), Internet portals (e.g., searching among millions or billions of records), financial data (e.g., information about stock exchange data), etc.

In the following detailed description, numerous specific details are set forth to provide a thorough understanding of claimed subject matter. However, it will be understood by a person of ordinary skill in the art in light of this specification that claimed subject matter may be practiced without necessarily being limited to these specific details. In some instances, methods, apparatuses or systems that would be known by a person of ordinary skill in the art have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

A Computer System or Device

FIG. 1 is a block diagram showing elements of an illustrative computer system 100 that is configured to implement embodiments of the systems and methods described herein. The computer system 100 may include one or more processors 110 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 100, such as various versions of Unix, Linux, Windows® from Microsoft Corporation, MacOS® from Apple Inc., or any other operating system that enables the operation of software on a hardware platform. The processor(s) 110 may be coupled to one or more of the other illustrated components, such as a memory 120, by at least one communications bus.

In one embodiment, a specialized graphics card or other graphics component 156 may be coupled to the processor(s) 110. The graphics component 156 may include a graphics processing unit (GPU) 170, which in some embodiments may be used to perform at least a portion of the techniques described below. Additionally, the computer system 100 may include one or more imaging devices 152. The one or more imaging devices 152 may include various types of raster-based imaging devices such as monitors and printers. In one embodiment, one or more display devices 152 may be coupled to the graphics component 156 for display of data provided by the graphics component 156.

In one embodiment, program instructions 140 that may be executable by the processor(s) 110 to implement aspects of the techniques described herein may be partly or fully resident within the memory 120 at the computer system 100 at any point in time. The memory 120 may be implemented using any appropriate medium such as any of various types of ROM or RAM (e.g., DRAM, SDRAM, RDRAM, SRAM, etc.), or combinations thereof. The program instructions may also be stored on a storage device 160 accessible from the processor(s) 110. Any of a variety of storage devices 160 may be used to store the program instructions 140 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 160 may be coupled to the processor(s) 110 through one or more storage or I/O interfaces. In some embodiments, the program instructions 140 may be provided to the computer system 100 via any suitable computer-readable storage medium including the memory 120 and storage devices 160 described above.

The computer system 100 may also include one or more additional I/O interfaces, such as interfaces for one or more user input devices 150. In addition, the computer system 100 may include one or more network interfaces 154 providing access to a network. It should be noted that one or more components of the computer system 100 may be located remotely and accessed via the network. The program instructions may be implemented in various embodiments using any desired programming language, scripting language, or combination of programming languages and/or scripting languages, e.g., C, C++, C#, Java™, Perl, etc. The computer system 100 may also include numerous elements not shown in FIG. 1, as illustrated by the ellipsis.

An Image Analysis Module

Figure 2:
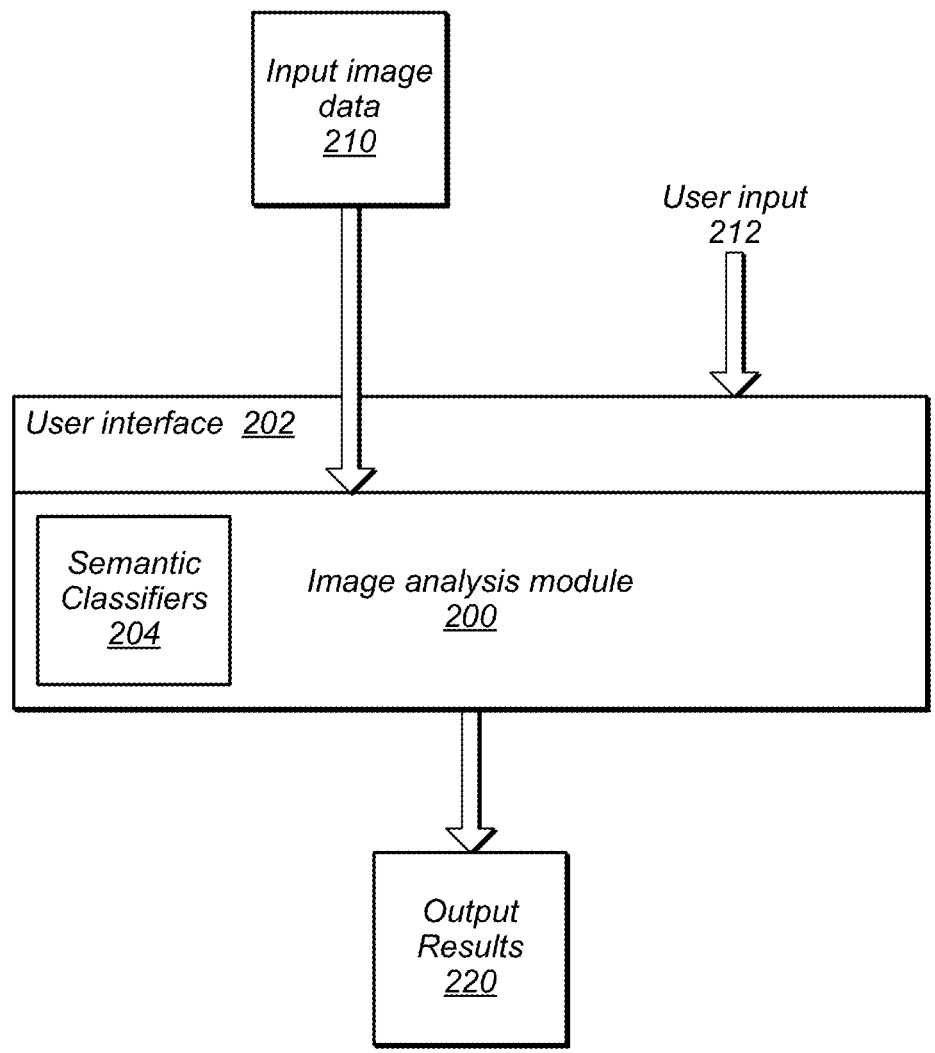
FIG. 2 is a block diagram of an illustrative image analysis module according to some embodiments.

FIG. 2 shows an illustrative image analysis module that may implement certain embodiments disclosed herein. In one embodiment, module 200 may provide a user interface 202 that includes one or more user interface elements via which a user may initiate, interact with, direct, and/or control the method performed by module 200. Module 200 may be operable to obtain digital image data for a digital image 210, receive user input 212 regarding the image data, analyze the image data and/or the input, and output analysis results for the image data 220. In one embodiment, the module may include or have access to additional or auxiliary image-related information, e.g., a collection of representative images, feature descriptors, a visual alphabet, etc., as will be discussed in detail below. Further details regarding the functionality provided by the module 200 are discussed below.

Image analysis module 200 may be implemented as or within a stand-alone application or as a module of or plug-in for an image processing application. Examples of types of applications in which embodiments of module 200 may be implemented may include, but are not limited to, image (including video) analysis, characterization, search, processing, and/or presentation applications, as well as applications in security or defense, educational, scientific, medical, publishing, digital photography, digital films, games, animation, marketing, and/or other applications in which digital image analysis, characterization, representation, or presentation may be performed. Specific examples of applications in which embodiments may be implemented include, but are not limited to, Adobe® Photoshop® and Adobe® Illustrator®. Module 200 may also be used to display, manipulate, modify, classify, and/or store images, for example to a memory medium such as a storage device or storage medium.

Compact Representation of High-Dimensional Image Descriptors

Figure 3:
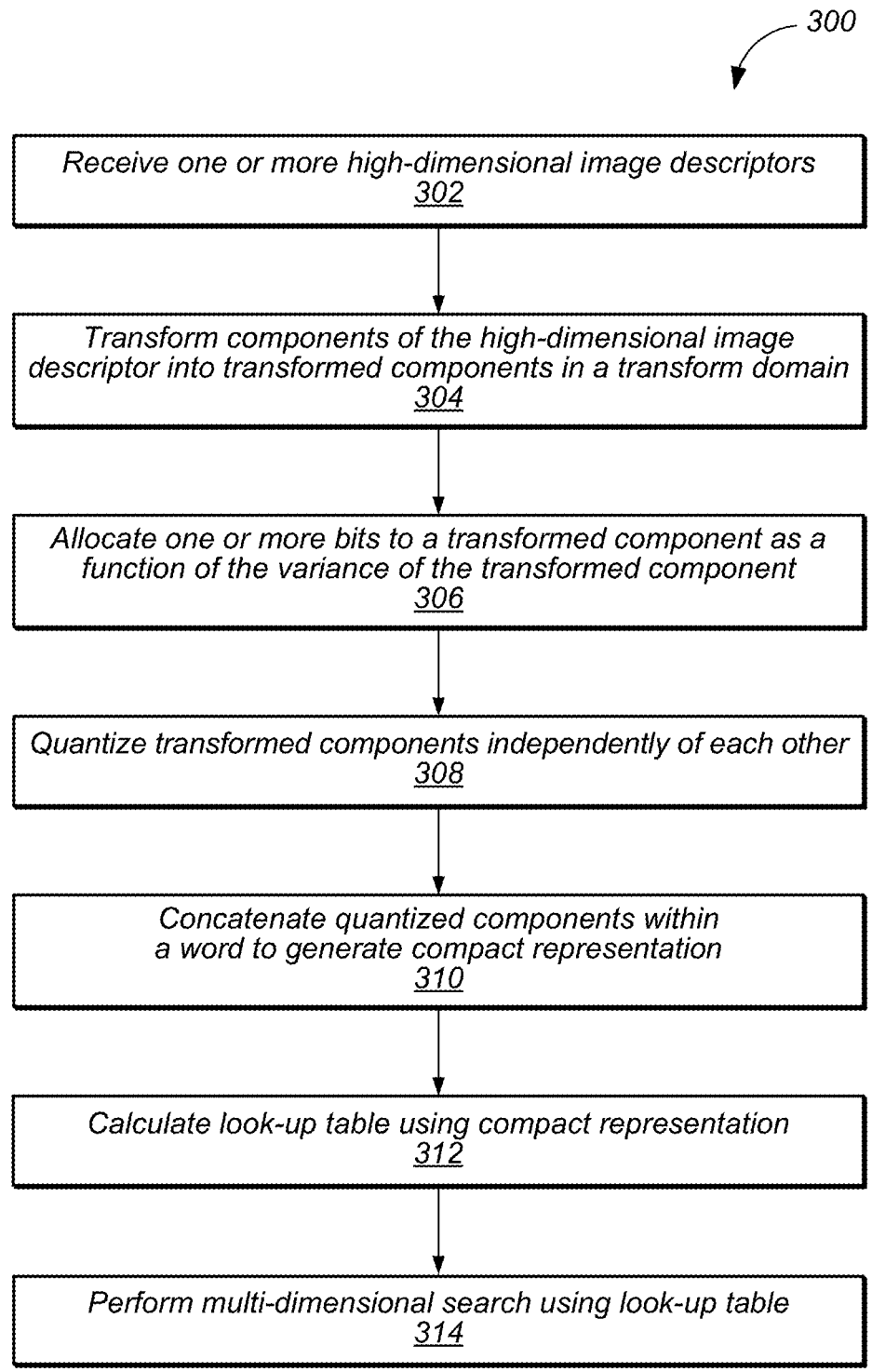
FIG. 3 is a flowchart of a method for generating a compact representation of high-dimensional image descriptors according to some embodiments.

Referring to FIG. 3, a flowchart of a method for generating a compact representation of high-dimensional image descriptors is described according to some embodiments. As illustrated, method 300 may employ transform coding, non-uniform data-driven bit allocation, and distortion-reducing or minimizing non-uniform product quantization to create a compact representation for a high-dimensional image descriptor. This compact representation may then be used in a nearest neighbor search operation as part of, for example, a k-nearest neighbor image classification process, an image retrieval process, a bag-of-words retrieval process, and/or a local image feature matching process.

Particularly, method 300 may receive one or more high-dimensional image descriptors at 302. At 304, method 300 may transform components of an image descriptor into transformed components ("transform coding"). At 306, method 300 may allocate bits to a subset of the transformed components ("bit allocation"). At 308, method 300 may quantize the subset of transformed components ("quantization"). Method 300 may then concatenate two or more of the quantized components into a word at 310 to generate a compact representation of the received high-dimensional image descriptor(s).

Still referring to FIG. 3, method 300 may calculate one or more look-up tables based on the compact representation at 312. At 314, method 300 may perform a search operation using the look-up tables. In some embodiments, a search operation may be part of, for example, a k-nearest neighbor image classification process, an image retrieval process, a bag-of-words retrieval process, and/or a local image feature matching process. Each of these processes may in turn be used in applications including, for example, object recognition, 3D modeling, mapping, navigation, gesture recognition, etc.

As noted above, operation 302 of method 300 may receive an image descriptor. In some embodiments, each image descriptor may denote a single image (one-to-one representation). For example, descriptors that are suitable for one-to-one representation include global image feature/spatial envelope ("GIST") descriptors and the like. In other embodiments, each image (or portion thereof) may be described by multiple local descriptors (one-to-many representation). In those embodiments, each image may have tens or hundreds of descriptors, and each descriptor may in turn contain hundreds or thousands of dimensions or features. Examples of high-dimensional image descriptors suitable for one-to-many representation include the Scale-Invariant Feature Transform ("SIFT") descriptors, the Speeded Up Robust Features ("SURF") descriptors, etc.

Each of the remaining operations shown in FIG. 3 is discussed in detail below under appropriately named headings.

Transform Coding

In some embodiments, a quantizer operation—such as the one depicted as operation 308 of FIG. 3—may depend on an assumption that the components of a high-dimensional image descriptor x (i.e., a query point in vector format) are statistically independent so that each vector component may be quantized independently. This assumption may be addressed at 304 of method 300 through transform coding. Transform coding may seek a (typically linear) transformation to reduce statistical dependence among the components.

In a non-limiting example, a transform operation may be achieved through principal component analysis (PCA), although a person of ordinary skill in the art will recognize in light of this specification that other suitable alternatives exist. Specifically, operation 304 of may compute eigenvectors and eigenvalues of a training sample covariance, and mean value(s) may be removed. A matrix of eigenvectors is a unitary transformation U that may be applied to some or all points prior to quantization. Given that the statistical dependence among the components is reduced through PCA (or other) transformation, the transformed components may be quantized independently. As such, a product quantizer may be designed for points $y = Ux$.

As such, the quantizer design problem may be reduced to a set of n independent 1D-problems—i.e., each $q_i$ may be designed independently to minimize the expected distortion $D_i = E[d_i(x_i, c_i(q_i x_i)))]$. Because $D = \Sigma_i D_i$, minimizing each $D_i$ independently also minimizes D.

Figure 4:
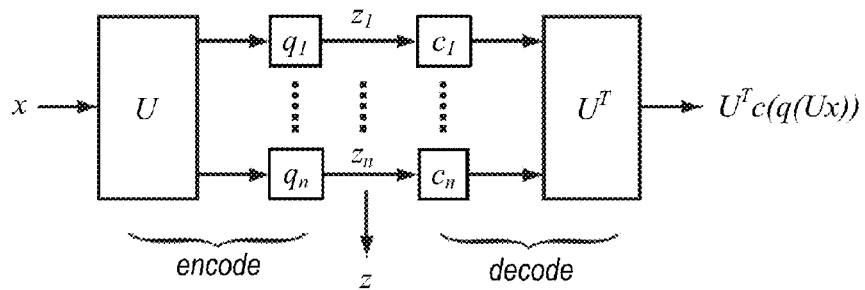
FIG. 4 is a block diagram of an encoding and reconstruction process according to some embodiments.

FIG. 4 is a block diagram of an encoding and reconstruction process according to some embodiments. As illustrated, encoding of a new point may comprise performing a PCA projection (shown as "U") followed by quantization of its components (shown as "q"). Reconstruction of a centroid in the input space from quantized point may entail constructing c=(c1, c2, ..., ct) in the transform space, back projecting it with $U^T$, and adding back any previously removed mean value(s). Moreover, the quantizer levels may be indexed by a set of integer index values z such that, for example, z=(1, 2, ..., t1).

As shown in FIG. 4, in some embodiments a PCA operation may determine the transformation U as part of an encoder design process. U may therefore reduce or eliminate a correlation between components. Because components in the transform domain are statistically orthogonal to each other, each component may be encoded or compressed independently.

Figure 5:
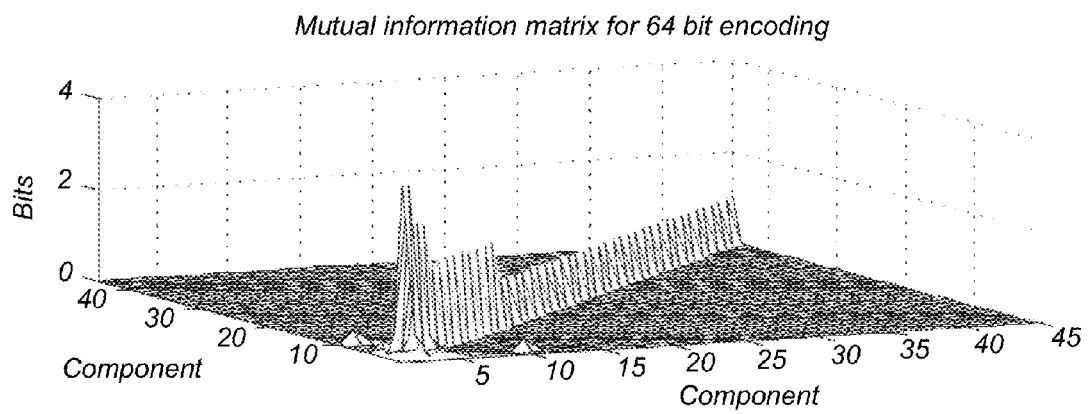
FIG. 5 is a graph illustrating mutual information between each pair of components of a high-dimensional descriptor after quantization according to some embodiments.

As an example, FIG. 5 is a graph illustrating mutual information between each pair of components of a high-dimensional descriptor after quantization according to some embodiments. The two horizontal axes indicate each component pair, and the vertical axis indicates the magnitude of the dependencies among each component pair. This graph shows that small, second-order statistical dependencies may remain after a PCA projection or the like. This is shown in the off-diagonal area—in this example—the largest off-diagonal term is 0.55 bits. In other examples, the graph may show zero mutual information among components everywhere except in the main diagonal. Even in this case, however, the sum of the diagonal terms is 62.2 bits, indicating that little may be gained by further compression, such as through entropy coding or the like. This demonstrates that these components are statistically independent, and that efficiency is not lost by treating them as such.

In cases where operation 304 of FIG. 3 does not result in complete statistical independence of the transformed components, quantizing operation 308 may not be optimal with respect to distance distortion. In other cases (with the exception of the squared Euclidean metric), quantizer distortion may not be expressible as the sum of the per-component distortion functions $D_i$. Nevertheless, it has been found that any such sub-optimality in operation 308 is offset by training simplicity and low computational cost. Additionally, experiments using real world data indicate that such transform coder outperforms competing methods in a broad set of situations, including those with non-Euclidean metrics, as described in the Applications section.

Bit Allocation

Referring back to FIG. 3, at 306 one or more bits are allocated to a transformed component. This operation may determine how many bits are allocated to each component. For instance, if some components are more significant than others, then operation may allocate more bits to those components. Bits may be distributed as a function of how much variance exists in the component—i.e., how much the coefficient values range in the statistical sample. In some embodiments, In some embodiments, bit allocation may be based on the corresponding eigenvalues described in the previous section.

In general, a minimum distortion criterion may be sufficient to design a product quantizer if the number of distinct quantization levels per component is known. Determining the number of levels per component is referred to herein as bit allocation. In some embodiments, bit allocation involves reducing or minimizing:

$$D(b) = \sum_i D_i(b_i),$$

such that $\Sigma_i b_i = \log_2 m|$, where D(b) is a distortion, m is a number of quantization levels, and $b=(b_1, b_2, \ldots,)|$ is a vector of per-component bit allocations.

An exact solution of the distortion equation for general distributions may involve a computationally prohibitive numerical search. In some embodiments, however, it may be assumed that each component is identically distributed after normalizing their variance, and that the per-component distortion functions are identical. In this case, optimal bit allocation may be achieved when:

$$b_i \sim \log_2 \sigma_i$$

where $\sigma_i$ is the standard deviation of the i-th component. Therefore, $\sigma_i$ may be estimated from the training data to allocate bits to each component proportionally.

In some embodiments, it may be preferable that each $b_i$ be integer-valued so that the components $q_i(x_i)$ may be concatenated to encode q(x) as a contiguous bit vector. This may ensure that an overall bit budget is met, while proportionally allocating an integer number of bits to each component. For example, one suitable sequential distribution procedure is shown below:

Initialize $H(i) \leftarrow \log_2 \sigma_i$, $B(i) \leftarrow 0$.
for j=1 to b do
I←arg max H(i).
B(i)←B(i)+1.
H(i)←H(i)−1.
end for After the bit allocation operation, it may be that some components are allocated no bits at all, thus resulting in a dimensionality reduction since those particular components may be omitted from z (i.e., the set of integer index values corresponding to quantizer levels as discussed above).

Figure 6:
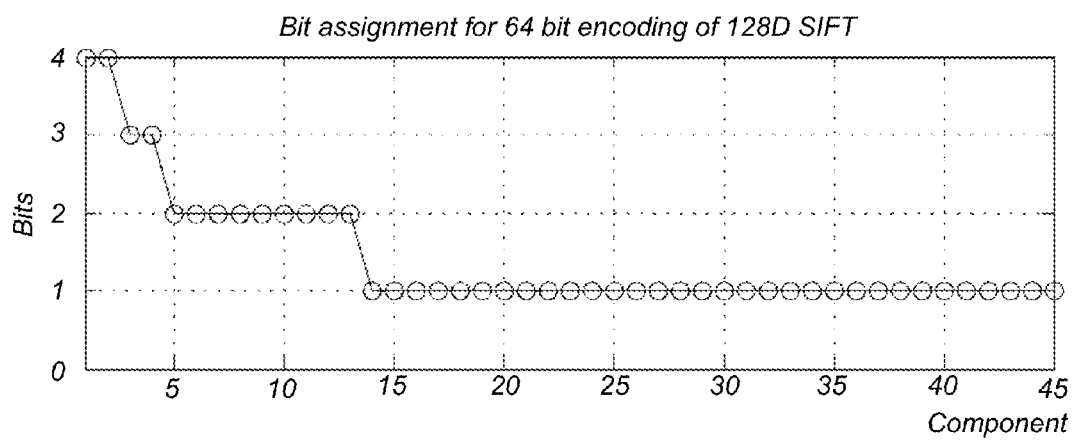
FIG. 6 is a graph illustrating bit allocation to components of a high-dimensional descriptor according to some embodiments.

As a non-limiting example, consider a 128D SIFT descriptor compressed to 64 bits. FIG. 6 depicts a 64 bit assignment or allocation to each of the 45 highest energy principal components of the descriptor. The horizontal axis indicates each component and the vertical axis indicates the number of bits allocated to each component. Specifically, in this particular example the first 2 components received 4 bits, next 2 components received 3 bits, and the following 9 components received 2 bits, etc. The remaining components—i.e., components 46 through 128—may receive zero bits and may consequently be dropped from the process.

It may be seen from FIG. 6 that, after performing operation 304, the first few components of the transformed descriptor may be very significant and have most of the information. Accordingly, in operation 306 this first subset of components may take the most number of bits. When there are no more bits left within the bit budget, a second subset of components may not get any bits, which may result in a dimensionality reduction.

In summary, operation 306 may provide a principled method to select a subset of dimensions, and simultaneously allocate bits to the remaining dimensions, given a fixed overall bit budget, while minimizing D.

Component Specific, Non-Uniform Quantization

Still referring to FIG. 3, operation 308 may determine, given a probability distribution, a non-uniform quantizer for a 1-dimensional signal. Quantization in general has been the subject of prolonged study. A quantizer q: $\mathbb{R}^n \to Z$, where $Z=\{0, 1, \ldots, m-1\}$, may be characterized by the partition it induces on the input space:

$$Q(z)=\{x:q(x)=z\}|,$$

for $z \in Z|$, and the codebook values associated with each z, c(z) $\in \mathbb{R}$.

The quality of a given quantizer may be measured in terms of its average distortion, $$D=E[d(x,c(q(x)))]|,$$

where the distortion function d can take on a variety of forms. For retrieval, for example, an appropriate distortion function to be minimized may be the metric d(x, x'). In fact, application of the triangle inequality yields:

$$E[|d(x,x')-d(x,c(q(x')))|] \leq D|.$$

Therefore, D may be seen as an upper bound on the expected error in estimating inter-point distances when one of the two points is approximated by its quantized codebook value. Consequently, a quantizer that minimizes D for a fixed m may be effective from the standpoint of near neighbor search.

A quantizer that minimizes D subject to the underlying distribution p(x) may be characterized by the following two properties:

$$Q(z)=\{x:d(x,c(z)) \leq d(x,c(z'))\, \forall z' \in Z\}, \text{ and} \qquad 1.$$

$$c(z)=\arg\min_x E_x[d(x,x')|x \in Q(z)]. \qquad 2.$$

For instance, in certain embodiments, the Lloyd-Max algorithm may be used to obtain a one-dimensional minimum distortion quantizer. This particular algorithm is described, for example, at "Vector quantization and signal compression," A. Gersho and R. Gray, Kluwer, 1991 and "Quantization," R. Gray and D. Neuhoff, IEEE Trans. on Inf. Th., 44(6):2325-2383, 1998. Moreover, in some embodiments, a number of quantization levels allocated to a given component may be a function of a statistic of the given component as determined from a training sample.

Distance Estimation

In some embodiments, systems and methods described herein may perform an estimation operation that estimates distances among components of high-dimensional image descriptors described in the preceding section. These estimated distances may enable fast, high-dimensional queries, as will be described in a later section.

Generally, both Radial and Nearest-k queries may involve an estimation of d(x, x') for each retrieved point x'∈X|. In practice, however, it may often be too expensive to physically retrieve the points or to evaluate the exact distances. Thus, in some embodiments, retrieved points may be ranked based at least in part on the distances from the query point to the centroids for each retrieved point.

The centroid for a particular quantization cell may be constructed by inverting the projection as depicted in FIG. 4. The resulting estimated distance $d_{IA}$ ("I" refers to the fact that $d_{IA}$ is evaluated in the input space) may be denoted as:

$$d_{IA}(x,x')=d(x,U^T c(q(Ux')))|$$

Meanwhile, the distance between centroids, measured in the input space, may be denoted as:

$$d_{IS^o}(x,x')=d(U^T c(q(Ux)), U^T c(q(Ux')))|$$

Because $d_{IS}$ may include quantization noise for both points rather than just one, it may be a poorer estimate of d than $d_{IA}$. However, $d_{IS}$ may have the advantage over $d_{IA}$ of being static for a given quantizer, independent of the query, and consequently can be pre-computed.

For a large number of bits, it may be impractical to enumerate and store pairwise distances between all centroids. However, this problem may be circumvented by computing distances in the transform domain instead of the input domain. Therefore, in some embodiments, $d_{TA}$ and $d_{TS}$ may be calculated as follows:

$$d_{TA}(x,x')=d(Ux,c(q(Ux')))|$$

and $$d_{TS}(x,x')=d(c(q(Ux)),c(q(Ux')))|.$$

High-Dimensional Searches

Referring back to FIG. 3, in some embodiments, components of the quantized descriptor may be decomposed into a tuple of 8 bit words at 310 to generate a compact representation for the original high-dimensional descriptor. In other embodiments, different size words may be used as desired. Moreover, these components may be permuted as needed to ensure that no component straddles a word boundary. At 312, pre-calculated look-up tables may be constructed for each word to store partial distance(s) determined by components belonging to that word at 312. For example, for a code having of b total bits, [b/8] 256-entry look-up tables may be calculated.

At 314, method 300 may perform a multi-dimensional search using the pre-calculated look-up tables to compute distances $d_{TA}$ and/or $d_{TS}$ as discussed in preceding sections. In some embodiments, evaluation of $d_{TS}$ may be very fast using 1D look-up tables constructed at query time. This may be appropriate in a large-scale retrieval setting where the cost of look-up table construction is small compared to the cost of search. Meanwhile, evaluation of $D_{TS}$ may be implemented using static (query independent) 2D lookup tables, and therefore may be more practical in an image matching setting.

Figure 7:
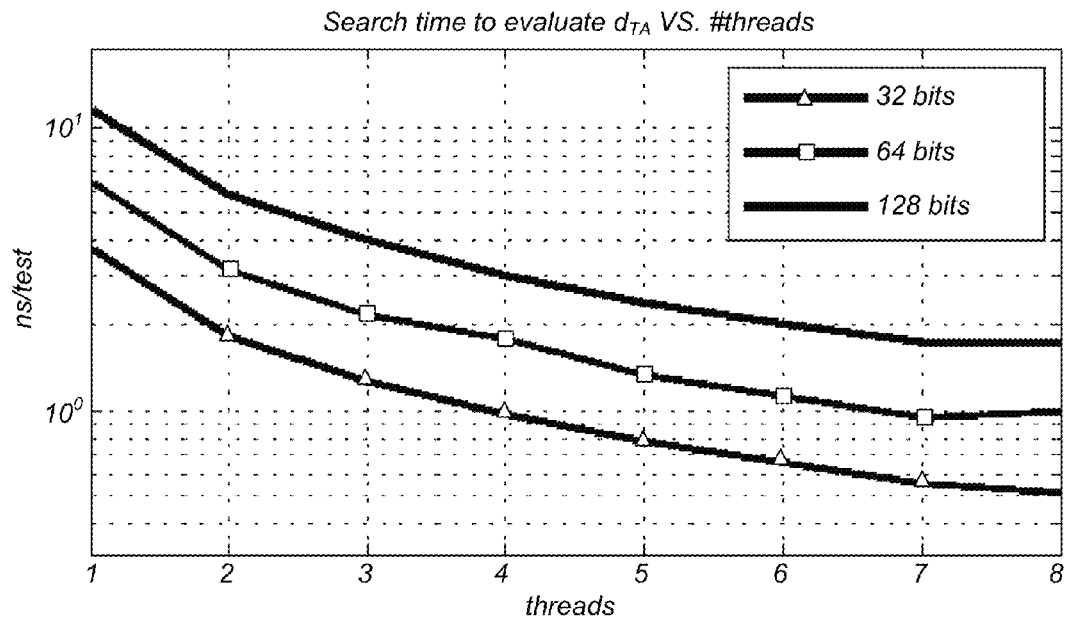
FIG. 7 is a graph of search times obtained by exhaustively evaluating $d_{TA}$ on a large set of quantized SIFT descriptors according to some embodiments.

FIG. 7 is a graph illustrating search times obtained by exhaustively evaluating $d_{TA}$ on a large set of quantized SIFT descriptors at several bit rates (32, 64, and 128 bits) using the squared Euclidean metric according to some embodiments. The horizontal axis shows the number of threads, and the vertical axis shows the search time to evaluate $d_{TA}$ (in nanoseconds per tested point) where search times are the average of 10 passes over a 100 MB dataset. These execution times were obtained using a dual quad-core Intel Xeon X5550 CPU running at 2.67 GHz, which may correspond to processor(s) 110 of FIG. 1. This linear scan may be parallelized; hence the graph shows near linear speed-up as the number of threads is increased. For example, at 64 bits, one point on average was processed per nanosecond using 8 threads, enabling exhaustive search of one billion points in a second.

In some embodiments, distance evaluation for a single point at operation 314 of method 300 may involve summing look-up table values for the given quantized point, and appending the point index to a row in a pre-allocated 2D output buffer indexed by the quantized distance value. The number of rows in the output buffer may determine the maximum search radius, and the number of columns may limit the total number of points that are kept for a given quantized distance. After passing over the entire data set, the output buffer may be scanned to extract the closest k indices.

As a person of ordinary skill in the art will recognize in light of this specification, a variety of other techniques exists for asymptotically sub-linear search using hierarchical structures of one sort or another. However, an advantage of linear search is that it is ideally suited to modern system architectures optimized for high memory locality and streaming data.

Applications

This portion of the specification illustrates the performance of the systems and methods disclosed herein in a wide range of applications. In each experiment discussed below, the training and encoding algorithms are identical, parameterized only by the desired number of bits and the applicable metric. The method of search may vary depending on the application.

Large-Scale Retrieval

In some embodiments, the systems and methods disclosed herein may be used in large-scale retrieval applications. An illustrative large-scale retrieval experiment was performed employing the French National Institute for Research in Computer Science and Control (INRIA) Holidays dataset comprising 128D SIFT descriptors divided among a training set, search set, and query set. The training set was separately collected from a random sampling of images obtained on the Internet. The search set contains 1 million points, and the query set contains 10 thousand. Descriptor similarity is the Euclidean metric.

Figure 8:
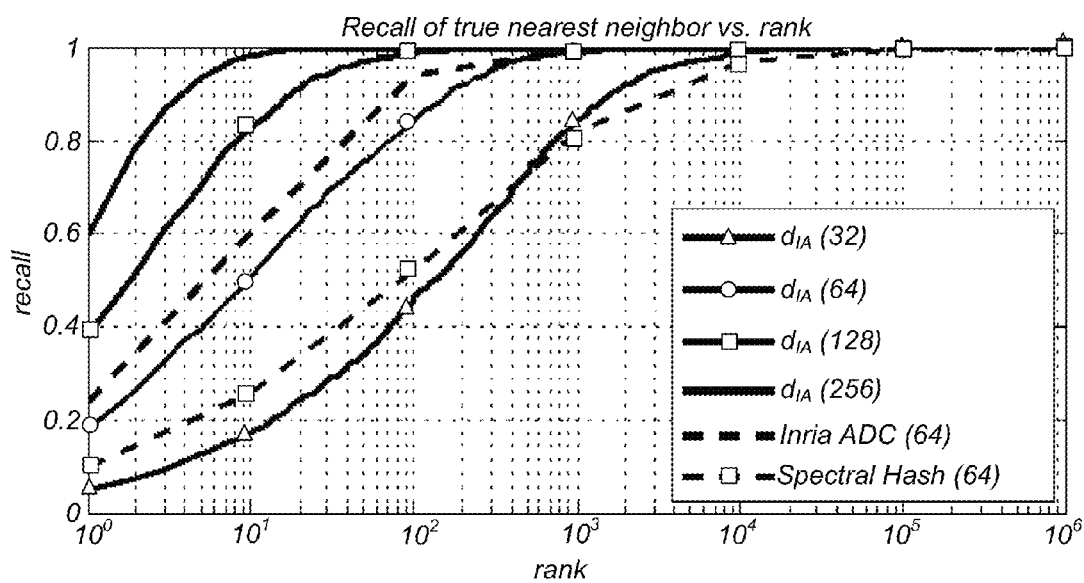
FIG. 8 is a graph showing an example of a probability that the nearest point to a query is among the most relevant R points returned by a given encoding scheme in a large-scale retrieval application according to some embodiments.

FIG. 8 illustrates an example of the probability that the nearest point to a query is among the most relevant R points returned by a given encoding scheme ("Recall @ R") for a range of values of R, averaged over a large number of queries. In the graph, "$d_{LA}(n)$" denotes a transform code using n bits and distance estimator $d_{LA}$. "Inria ADC (64)" is a competing 64-bit vector quantization scheme, and "Spectral Hash (64)" is the 64 bit spectral hash. These results indicate that, at 64 bits, the systems and methods disclosed herein perform significantly better than spectral hashing, achieving equal retrieval rates at roughly an order of magnitude smaller R. The accuracy of the 64 bit transform code is slightly lower than that of Inria ADC (64) because, in the Inria ADC (64) scheme, the structure of the SIFT descriptor is exploited to attain good vector quantization efficiency. In contrast, this experiment makes no assumptions about the structure of the data, instead learning it through PCA.

Figure 9:
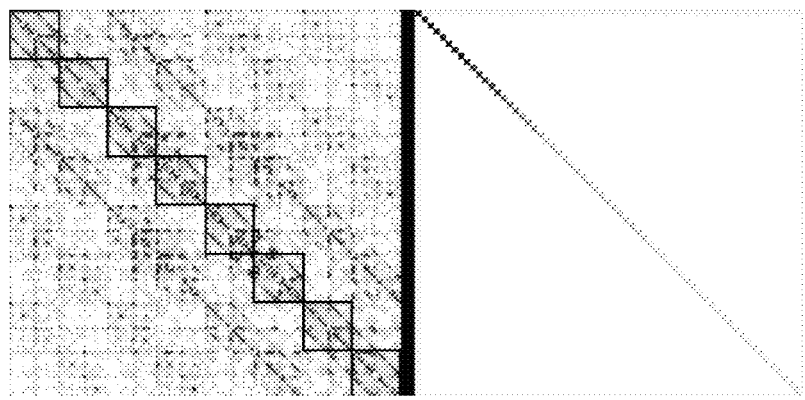
FIG. 9 is an example of a two-dimensional map of training sample covariance in a large-scale retrieval application according to some embodiments.

FIG. 9 depicts an example of the training sample covariance before (left) and after (right) PCA. Competing methods quantize each of eight 16D sub-vectors, thus representing the eight 16×16 blocks (depicted as squares in the left graph) along a main diagonal using a constant number of bits per sub-vector. In contrast, the systems and methods disclosed herein encoded each of the components independently after most of the statistical dependencies between components have been eliminated through PCA. Moreover, the systems and methods disclosed herein also allocated bits to the components proportional to the component energies.

The systems and methods disclosed herein may be relatively simple and efficient to train and to encode high-dimensional image descriptors for large-scale retrieval applications. Specifically, the computational complexity involved in training and encoding grows slowly as the number of bits is increased, unlike methods in which computational complexity grows exponentially with respect to the number of bits (unless the descriptor is further decomposed into smaller units, which may be less advantageous with respect to the structure of the data).

Another characteristic of the systems and methods disclosed herein is that linear search is faster. And, as shown in FIG. 8, performance improves continuously as the number of bits increases. This may be attributed in part to the fact that the embodiments disclosed herein adapt to the data as part of the training process. Moreover, systems and methods disclosed herein are flexible, in part, because they may be applied to non-Euclidean metrics.

k-Nearest Neighbor Classification

In some embodiments, the systems and methods disclosed herein may be used in k-nearest neighbor (k-NN) classification applications. For example, some embodiments may provide nearest neighbor search techniques that remain practical as the number of object or image categories increases to thousands or even tens of thousands. In one experiment, the Massachusetts Institute of Technology (MIT) scene category dataset was evaluated. The dataset includes 2,688 images distributed among 8 scene categories. The training data has 100 randomly selected images from each category. The remaining images constitute the test set. Nearest neighbor search is based on the Euclidean metric applied to the 960D GIST descriptor computed for each image.

Figure 10:
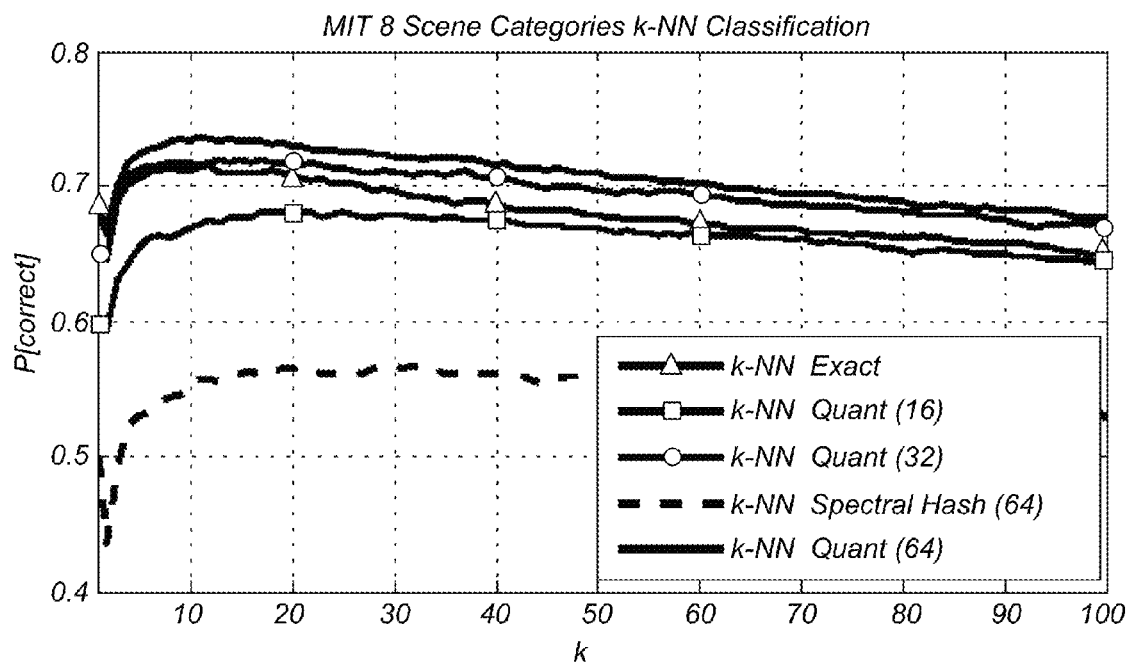
FIG. 10 is a graph showing an example of a probability of correct classification in a k-nearest neighbor classification application according to some embodiments.

FIG. 10 shows an example of the probability of correct classification using the k-NN criterion (namely, vote among the labels of the k nearest neighbors) plotted as a function of k and at varying levels of quantization according to some embodiments. In the graph, "k-NN Exact" uses the exact Euclidean distance on the uncompressed descriptors, "k-NN Quant (n)" denotes the classifier based on the n bit transform code, and "k-NN Spectral Hash (64)" denotes the classifier based on the 64 bit spectral hash with Hamming metric. The reported values are the average over 10 trials, with each trial having a different randomly selected training set.

The results shown in FIG. 10 indicate that a 32-bit representation of the GIST descriptor is sufficient to exceed the performance of the exact k-nearest neighbor on this data set. This increase in performance is unexpected, and may be due to the dimensionality reduction intrinsic to the quantization process described above and which may serve to combat over-fitting. As shown in the graph, even at 16 bits, performance is close to that of the exact method, and significantly better than the 64 bit spectral hash.

Local Feature Matching

In some embodiments, the systems and methods disclosed herein may be used in local feature matching classification applications. Local feature matching typically refers to the process of forming the correspondence between two images using local feature descriptors, for instance using a SIFT algorithm to identify candidate corresponding feature point pairs, followed by Random Sample Consensus ("RANSAC") to determine a geometrically consistent subset of the candidate pairs, which are identified as inliers. As noted above, the systems and methods described herein may provide compression of high-dimensional image descriptors without loss of expressiveness. Accordingly, in some embodiments, these operations may accelerate the local feature matching process and may be especially suited for bandwidth-limited environments.

In one experiment, panorama image sets were collected and registered to obtain a ground truth homography between each overlapping image pair. The images were of varying resolution and subject matter, including natural and man-made settings. In total, the test set included 891 registered image pairs. Feature points were obtained from the images using a Difference of Gaussians ("DoG") detector. Each feature point was represented using a standard 128D SIFT descriptor.

The experiment encoded the SIFT descriptors at varying bit rates and measured the effectiveness of the matching process using the compressed representation in comparison to using the uncompressed representation. The methodology involved considering each pair of images as in the role of "source" and "target" for matching. For each source/target image pair, the experiment defined the "true inliers" as the set of feature pairs ($f_s$, $f_t$) such that $f_s$ is the closest source feature point to the target feature point $f_t$ after it is mapped to the source image under the known homography, and such that the distance between the two feature points in the source image is less than a fixed radius (e.g., 5 pixels). The experiment then used a distance ratio criterion to identify candidate matches based on the exact descriptor values and the Euclidean metric. The distance ratio criterion was the ratio of the distance in descriptor space of the closest descriptor to the second closest be less than a given fixed threshold (e.g., 0.8). The fraction of true inlier pairs that are in the matched set is the "inlier ratio," and it is related to the likelihood that the images can be registered using RANSAC. The experiment then compressed the descriptors using a transform coder that was trained on a disjoint set of images and applied the same distance ratio criterion based on the $d_{TS}$ distance.

Figure 11:
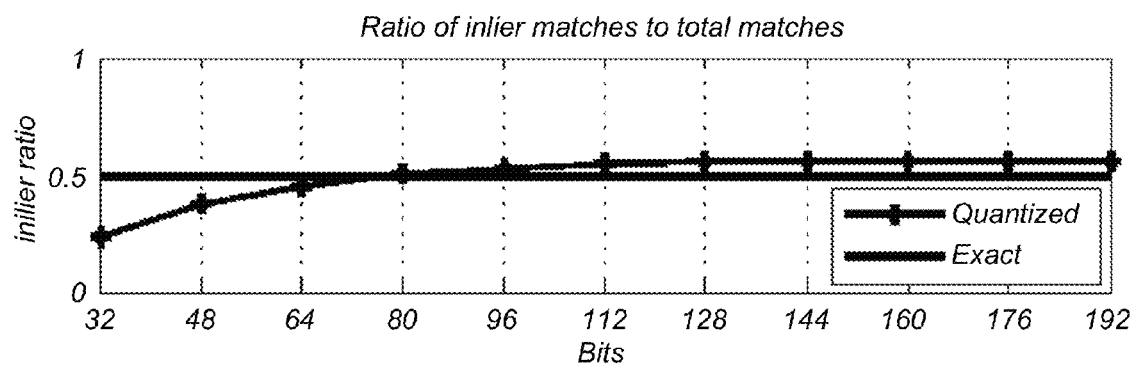
FIGS. 11 and 12 are graphs illustrating examples of the effectiveness of quantized SIFT descriptors in a local image matching application according to some embodiments.
Figure 12:
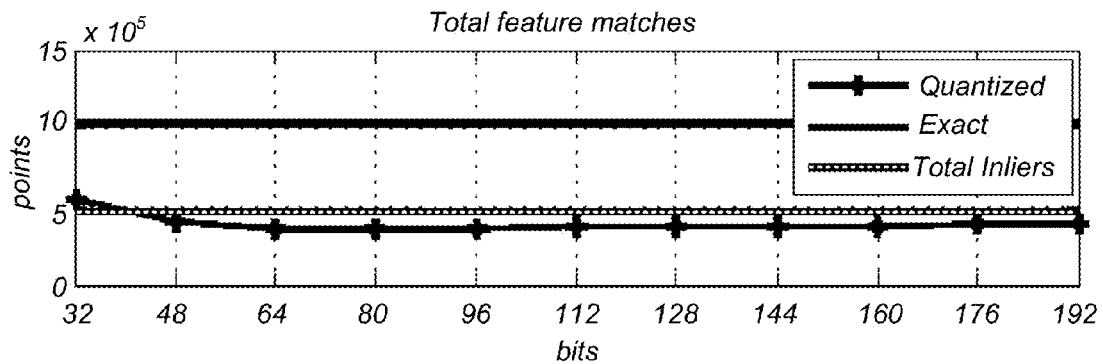

FIGS. 11 and 12 illustrate examples of aggregate results of the foregoing procedure for each pair of images. Particularly, FIG. 11 shows the fraction of matched inliers using the quantized representation at varying bit rates, whereas FIG. 12 shows the total number of matched points using the quantized representation. ("Exact" refers to the inlier ratio and number of matches obtained using the uncompressed descriptor.) From these graphs it may be seen that, at 80 bits, or 12.8:1 compression, the quantized descriptor was equally effective at identifying inlier matches as the uncompressed descriptor. The total number of matches using the quantized descriptor was less than that using the exact descriptor due to systematic bias in the quantized distance estimate. (Quantized distances tend to underestimate the exact distance.) Nevertheless, it may be concluded based on these results that the quantized descriptor of 80 bits may be sufficient for local feature matching in panoramas in some applications.

As discussed above, evaluation of $d_{TS}$ may be extremely fast using static 2D lookup tables. Also, compression obtained by use of the quantized descriptor may significantly improve performance in circumstances where the descriptors must be transmitted over a communications network.

Spatial Pyramid Bag-of-Words Retrieval

In some embodiments, the systems and methods disclosed herein may be used in spatial pyramid bag-of-words retrieval applications. The spatial pyramid bag-of-words scene representation has been shown to be effective for scene category classification, and scene similarity retrieval. However, conventional approaches are problematic to use in a large scale because the descriptors have high dimension (typically thousands of components), but are typically not sufficiently sparse for sparse methods, such as min-hash or inverted files, to be effective.

In one experiment, spatial pyramid bag of words descriptors were computed for each of the images in the MIT Indoor Scene Category dataset. Specifically, for each image, the experiment collected dense SIFT features in a grid pattern, quantized the feature descriptors into a vocabulary of 200 visual words, and then formed a three level spatial pyramid of histograms, resulting in a descriptor of 4,200 dimensions. (The vocabulary was learnt on a disjoint image set.) On average, 25% of the descriptor components was non-zero. The similarity metric was the frequency-inverse document frequency ("TFIDF")-weighted histogram intersection metric.

The experiment implemented a transform coder on this very high-dimensional descriptor and non-Euclidean metric in a retrieval setting. The entire dataset included 15,620 images. In each trial, 5,000 were randomly selected for training, 10,000 for the search set, and the remainder formed the query set.

Figure 13:
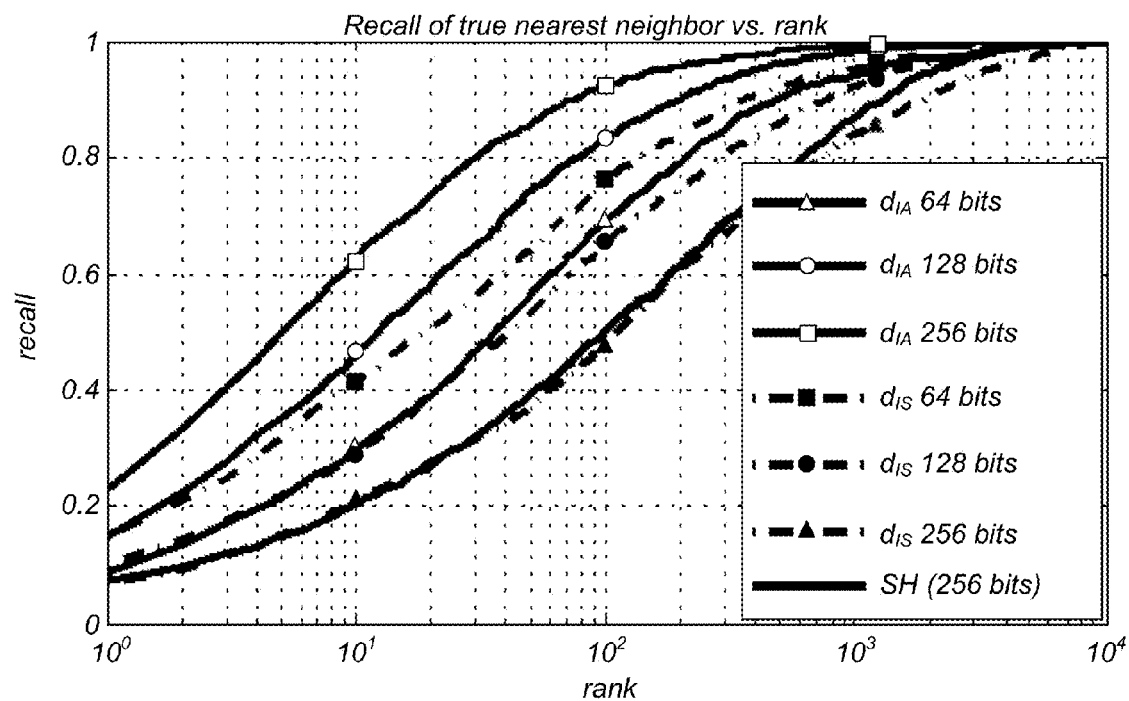
FIG. 13 is a graph showing an example of a probability that the nearest point to a query is among the most relevant R points returned by a given encoding scheme in a spatial pyramid bag-of-words retrieval application according to some embodiments.

FIG. 13 depicts an example of "Recall @ R" as defined above at a range of bit rates, and using both the $d_{IA}$ and $d_{IS}$ metrics. For comparison purposes, spectral hashing ("SH") was similarly evaluated. The results indicate that with a 256 bit code, or roughly 100:1 compression, the experiment exceeded 90% recall while retrieving only 1% of the data. Because of the non-Euclidean metric, the experiment evaluated distances in the input space which can be more expensive than operating in the transform space. However, the most expensive part—i.e., reconstruction of the quantized points or evaluation of $U^T c(q(Ux))$—may be accelerated through the use of lookup tables as described above. As expected, $d_{IA}$ may produce more accurate results than $d_{IS}$ due to $d_{IA}$ having less quantization noise in some applications.

The various methods as illustrated in the figures and described herein represent example embodiments of methods. The methods may be implemented in software, hardware, or a combination thereof. The order of method may be changed, and various elements may be added, reordered, combined, omitted, modified, etc. Various modifications and changes may be made as would be obvious to a person of ordinary skill in the art having the benefit of this specification. It is intended that the invention embrace all such modifications and changes and, accordingly, the above description to be regarded in an illustrative rather than a restrictive sense.

What is claimed is:

1. A computer-readable storage medium, excluding signals per se, comprising instructions stored thereon that, responsive to execution by a computing device, direct the computing device to perform operations comprising:
    transforming components of a image descriptor into transformed components in a transform domain;
    quantizing the transformed components;
    generating a compact representation of the image descriptor based, at least in part, on the quantized components; and
    responsive to the generating, constructing, at query time, a one-dimensional look-up table that stores a partial distance between two or more of the quantized components.

2. The computer-readable storage medium of claim 1, wherein the image descriptor is a SIFT descriptor.

3. The computer-readable storage medium of claim 1, wherein the quantizing reduces a distortion.

4. The computer-readable storage medium of claim 1, wherein the generating comprises concatenating the two or more of the quantized components into a word such that the quantized components do not straddle a word boundary.

5. The computer-readable storage medium of claim 4, the operations further comprising:
    calculating a partial distance between the quantized components within the word.

6. The computer-readable storage medium of claim 1, the operations further comprising allocating one or more bits available within a bit budget to a given transformed component within a first subset of transformed components as a function of a variance of the given transformed component, wherein a second subset of the transformed components receives zero bits.

7. The computer-readable storage medium of claim 1, wherein the transforming reduces a correlation among the components.

8. The computer-readable storage medium of claim 1, the operations further comprising evaluating a nearest neighbor search operation based, at least in part, on the compact representation of the image descriptor.

9. The computer-readable storage medium of claim 8, wherein the nearest neighbor search operation is performed based, at least in part, on the one-dimensional look-up table as part of a process selected from the group consisting of: a k-nearest neighbor image search, an image retrieval process, and a spatial pyramid bag-of-words retrieval process.

10. A method, comprising:
performing, by one or more computing devices:
transforming components of an image descriptor into transformed components;
allocating bits to a subset of the transformed components;
quantizing the subset of transformed components;
concatenating two or more of the quantized components into a word; and
constructing a two-dimensional look-up table, prior to a query, that stores a partial distance determined by the concatenated components within the word.

11. The method of claim 10, wherein concatenating comprises permuting the two or more quantized components within the word such that no quantized component straddles a word boundary.

12. The method of claim 10, further comprising applying the two-dimensional look-up table in a nearest neighbor search operation.

13. The method of claim 10, further comprising applying the two-dimensional look-up table in an image feature matching process.

14. The method of claim 13, the image feature matching process including an Internet search or microarray DNA analysis.

15. The method of claim 12, wherein the nearest neighbor search operation is performed based, at least in part, on the two-dimensional look-up table as part of a local feature image matching process.

16. A system, comprising:
at least one processor; and
memory, communicatively coupled to the at least one processor, storing instructions that responsive to execution by the at least one processor, cause the at least one processor to perform operations comprising:
quantizing components of a plurality of image descriptors;
concatenating two or more of the quantized components into a word such that the quantized components do not straddle a word boundary;
calculating a partial distance between the concatenated components; and
constructing, at query time, a one-dimensional look-up table that stores the partial distance between the concatenated components of the word.

17. The system of claim 16, the operations further comprising:
evaluating a nearest neighbor search based, at least in part, on the one-dimensional look-up table.

18. The system of claim 16, the operations further comprising, prior to quantizing:
transforming components of the image descriptors to reduce a correlation among the components.

19. The system of claim 16, where a number of quantization levels allocated to a given component is a function of a statistic of the given component as determined from a training sample.

20. The system of claim 16, the operations further comprising performing an Internet search based on the one-dimensional look-up table.

* * * * *

UNITED STATES PATENT AND TRADEMARK OFFICE
CERTIFICATE OF CORRECTION

PATENT NO. : 8,428,397 B1
APPLICATION NO. : 12/869133
DATED : April 23, 2013
INVENTOR(S) : Jonathan W. Brandt It is certified that error appears in the above-identified patent and that said Letters Patent is hereby corrected as shown below:

In the Claims:

Column 14, Line 34, delete "a" and insert -- an -- between "…components of" and "image descriptor…", therefor.

Signed and Sealed this
Tenth Day of September, 2013

Teresa Stanek Rea
*Acting Director of the United States Patent and Trademark Office*